(12) United States Patent
Strom

(10) Patent No.: US 7,630,900 B1
(45) Date of Patent: Dec. 8, 2009

(54) METHOD AND SYSTEM FOR SELECTING GRAMMARS BASED ON GEOGRAPHIC INFORMATION ASSOCIATED WITH A CALLER

(75) Inventor: Nikko Strom, Mountain View, CA (US)

(73) Assignee: TellMe Networks, Inc., Mountain View, CA (US)

( * ) Notice: Subject to any disclaimer, the term of this patent is extended or adjusted under 35 U.S.C. 154(b) by 622 days.

(21) Appl. No.: 11/002,003

(22) Filed: Dec. 1, 2004

(51) Int. Cl.
*G10L 21/00* (2006.01)
(52) U.S. Cl. ........................... 704/275; 704/270
(58) Field of Classification Search .......... 704/270–275
See application file for complete search history.

(56) References Cited

U.S. PATENT DOCUMENTS

| | | | |
|---|---|---|---|
| 5,553,119 A * | 9/1996 | McAllister et al. | 379/88.01 |
| 6,112,174 A * | 8/2000 | Wakisaka et al. | 704/251 |
| 6,285,785 B1 * | 9/2001 | Bellegarda et al. | 382/187 |
| 6,483,896 B1 * | 11/2002 | Goldberg et al. | 379/88.01 |
| 6,501,832 B1 * | 12/2002 | Saylor et al. | 379/88.04 |
| 6,789,065 B2 * | 9/2004 | Berner et al. | 704/275 |
| 6,978,237 B2 * | 12/2005 | Tachimori et al. | 704/238 |
| 7,143,039 B1 * | 11/2006 | Stifelman et al. | 704/270 |
| 7,401,023 B1 * | 7/2008 | Schwartz et al. | 704/275 |
| 2003/0101059 A1 * | 5/2003 | Heyman | 704/275 |
| 2005/0004800 A1 * | 1/2005 | Wang | 704/270.1 |

* cited by examiner

*Primary Examiner*—Richemond Dorvil
*Assistant Examiner*—Eric Yen
(74) *Attorney, Agent, or Firm*—Perkins Coie LLP

(57) ABSTRACT

A computer implemented method for automatically processing a data request comprising accessing a voice signal from a caller, determining geographic information associated with the caller from telephone network information associated with a call made by the caller, and retrieving a speech recognition grammar customized to the geographic information associated with the caller. The method further includes recognizing the voice signal by matching the voice signal to an entry of the speech recognition grammar and providing a directory listing to the caller based on the entry of the speech recognition grammar. The selected grammar may be customized to bias speech recognition to more frequently recognize cities local to the geographic information.

29 Claims, 8 Drawing Sheets

300A

| (408) Grammar |
|---|
| San Jose, CA |
| San Jose |
| Santa Clara, CA |
| Santa Clara |
| Boston, MA |
| Austin, TX |

| (707) Grammar |
|---|
| San Jose, CA (.80) |
| San Jose (.80) |
| Santa Clara, CA (.70) |
| Santa Clara (.70) |
| Boston, MA (.25) |
| Austin, TX (.25) |

| (512) Austin, Texas Grammar |
|---|
| Austin (.95) |
| Mertzon (.75) |
| Houston (.90) |
| Boston, MA (.05) |
| Austin, TX (.95) |

| (617) Boston, Massachusetts Grammar |
|---|
| Boston (.95) |
| Brockton (.75) |
| Austin, TX (.10) |
| Boston, MA (.95) |

Figure 3D

METHOD AND SYSTEM FOR SELECTING GRAMMARS BASED ON GEOGRAPHIC INFORMATION ASSOCIATED WITH A CALLER

BACKGROUND OF THE INVENTION

1. Field of the Invention

The present invention relates to methods for performing voice recognition. More specifically, embodiments of the present invention relate to improve voice recognition based on geographic information associated with a caller.

2. Related Art

As computer systems and telephone networks modernize, it has become commercially feasible to provide information to users or subscribers over audio user interfaces, e.g., telephone and other audio networks and systems. These services allow users, e.g., "callers," to interface with a computer system for receiving and entering information. A number of these types of services utilize computer implemented automatic voice recognition tools to allow a computer system to understand and react to callers' spoken commands and information: This has proven to be an effective mechanism for providing information because telephone systems are ubiquitous, familiar with most people and relatively easy to use, understand and operate.

In a directory assistance application, listings are searched for a particular locality. As a result, users must specify a city and state that the desired listing is located. One problem is that some cities have similar sounding names, for example, Moorestown, Morristown, and Mauricetown, in New Jersey. This can cause problems for a directory assistance application that uses voice recognition to determine what listing the caller wants.

Furthermore users sometimes omit the state when specifying cities, which makes many city names ambiguous to the voice recognition application. For example, Boston, Mass. and Austin, Tex. sound similar when the state is omitted. Also, there is a separate Springfield in the following states: New Jersey, Pennsylvania, Oregon, Illinois, Massachusetts, Virginia, Missouri, Tennessee, Georgia, Ohio, Maryland, Michigan, South Carolina, Vermont, Florida, Kentucky, Nebraska, Colorado, New York, Maine, New Hampshire, Louisiana, West Virginia, Minnesota, Arkansas, Wisconsin, Idaho, Indiana and South Dakota. As a result of the ambiguity, many times, a caller is presented the incorrect directory listing (e.g., a listing with a similar sounding name or a listing with the same name in another state). This further causes problems for a directory assistance application that uses voice recognition to determine what listing the caller wants.

SUMMARY OF THE INVENTION

Embodiments of the present invention include a method of performing voice recognition on a caller's voice signal based on geographic information associated with the caller. The method includes obtaining geographic information associated with a caller based on telephone network information provided in connection with a call made by the caller and identifying a particular grammar, which is dependent on the geographic information. The particular grammar is identified from a plurality of grammars, each specific to respective geographic information. The method further includes performing speech recognition on a voice signal of the call using a speech recognition engine that is supplied with the particular grammar. The particular grammar is customized to the geographic information and biases the speech recognition engine.

A system performing voice recognition based on geographic information associated with a caller is also presented in accordance with the above.

BRIEF DESCRIPTION OF THE DRAWINGS

The above and other objects and advantages of the present invention will be more readily appreciated from the following detailed description when read in conjunction with the accompanying drawings, wherein:

FIG. 3A is a block diagram of an exemplary city/state grammar according to a specific geographic information, e.g., area code, showing exemplary local city entries without a state name.

FIG. 3B is a block diagram of an exemplary weighted city grammar for a particular area code in accordance with embodiments of the present invention.

FIG. 3C is a block diagram of an exemplary weighted grammar for Austin, Tex. in accordance with embodiments of the present invention.

FIG. 3D is a block diagram of an exemplary weighted grammar for Boston, Mass. in accordance with embodiments of the present invention.

DETAILED DESCRIPTION OF THE INVENTION

Figure 1:
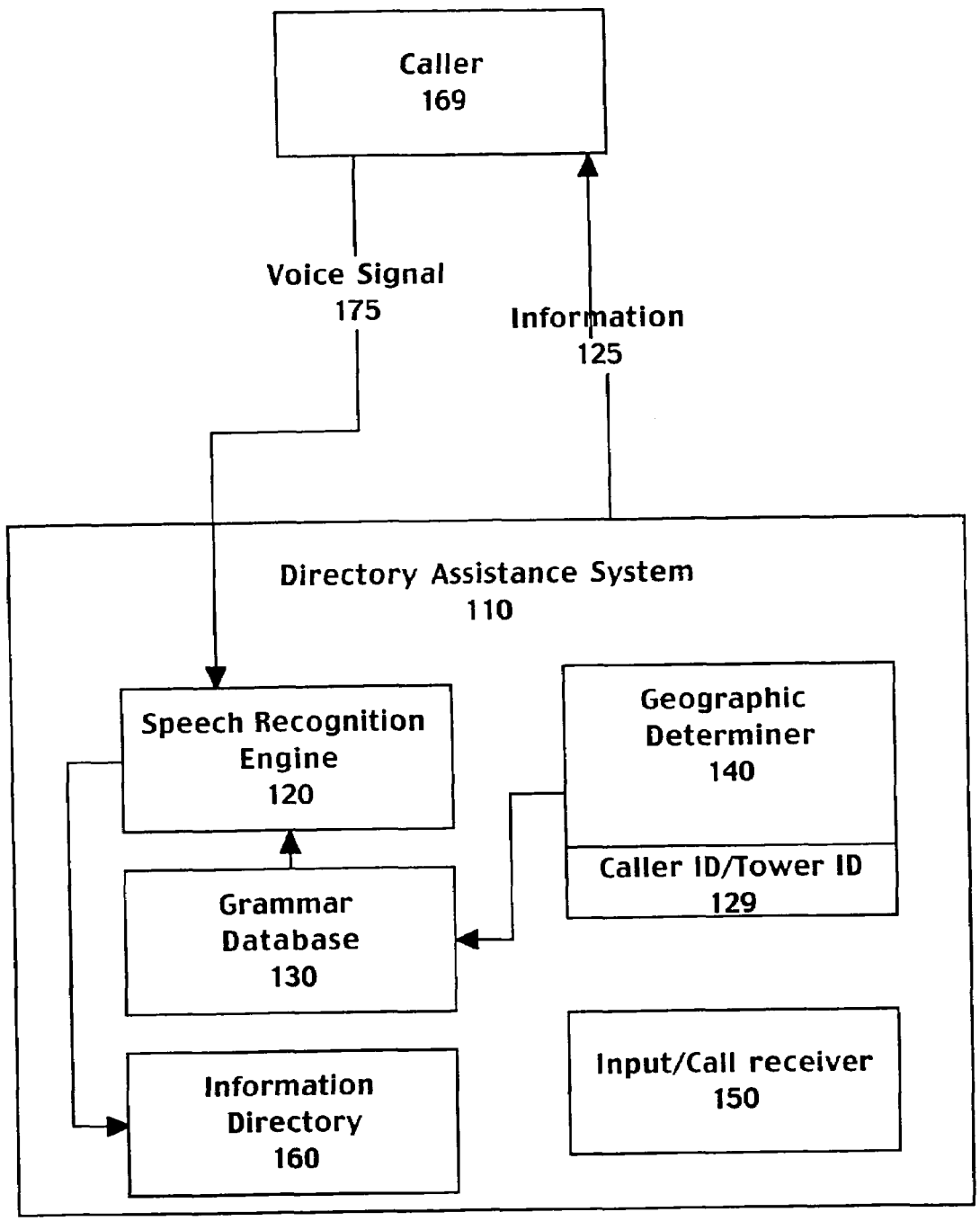
FIG. 1 is a block diagram of an exemplary directory assistance system comprising a voice recognition engine in accordance with embodiments of the present invention.

In the following detailed description of the present invention, improvements, advanced features, services and mechanisms for a speech recognition engine that uses grammars based on geographic information associated with a caller, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions that follow are presented in terms of procedures, steps, logic blocks, processing, and other symbolic representations of operations on data bits that can be performed on computer memory, e.g., processes 400, 500 and 600. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "determining" or "identifying" or "matching" or "providing" or "calculating" or "scrolling" or "obtaining" or "recognizing" or "pausing" or "waiting" or "listening" or "weighting" or the like, refer to the action and processes of a computer system, or similar electronic computing device or service, that manipulates and transforms data represented as physical (electronic) quantities within the computer system's registers and memories into other data similarly represented as physical quantities within the computer system memories or registers or other such information storage, transmission or display devices.

Embodiments of the present invention use different grammars for speech recognition based on geographic information associated with a caller. The selected grammar is customized for the geographic region of the caller. In one embodiment of the invention, the geographic region is identified from telephone network information associated with the call. In one embodiment of the invention, the area code of the caller is used to determine location information (e.g., geographic information) associated with the caller. In another embodiment of the invention, in the case of a call from a cellular phone, the cellular tower that the call was placed from is used to determine geographic information associated with the caller. Other well-known location determination techniques for obtaining geographic information of a caller could also be used based on telephone network information.

In other embodiments of the invention, the local city/state grammar have grammar weights adapted to the area such that cities that are frequently requested by callers in that area are weighted higher in the grammar other than city names. For example, Moorestown, Morristown, and Mauricetown are located in different parts of New Jersey and statistics for released directory listing requests show that the relative frequency of requests are very different from different area codes. In one embodiment of the invention call statistics are used to optimize the grammar weights on a per area code basis, resulting in significantly improved speech recognition accuracy. For instance, a caller from Texas is more likely to ask for Austin, Tex., not Boston, Mass. By increasing the weight associated with Austin over that of Boston, a caller from Texas is more likely to obtain accurate voice recognition of Austin, Tex.

For cities that are frequently requested from a particular area code, it is also more likely that users omit the state when making a directory request. In one embodiment of the invention, the geographic dependent city/state grammars allow such cities to be spoken without the state, and still avoid the problem with ambiguity on the national scale, because callers outside of the local region will need to recite the state along with the city.

FIG. 1 is a block diagram of an exemplary directory assistance system 110 comprising a speech recognition engine 120 in accordance with embodiments of the present invention. The directory assistance system 110 comprises an input/call receiver 150 for receiving a voice signal 175 from a caller 169. The caller 169 makes an audio directory request (e.g., voice signal 175) and the directory assistance system 110 returns information 125 to the caller 169. In one embodiment of the invention, the information 125 returned to the caller 169 is a telephone number for a directory listing. In one embodiment of the invention, the directory assistance system 110 automatically connects the caller 169 to the requested directory listing. City identification is required in order to provide the correct directory information 125.

The exemplary directory assistance system 110 comprises a geographic determiner 140 that determines geographic information associated with the caller 169. In one embodiment of the invention, the geographic determiner 140 comprises a caller ID/cellular tower ID determiner 129 that determines the location of the caller based on telephone network information associated with the caller 169. This geographic information may be obtained from the caller's area code and/or a cell tower identifier. This information is obtained automatically from telephone network information transparently to the user.

The geographic information can be used to help predict the information 125 that the caller 169 will request. It is appreciated that callers calling from a particular state or area code will be more likely to request directory listings for particular cities in that area or state. For example, callers from the (408) area code are more likely to call for directory listings in Santa Clara, Calif. than Santa Clarita, Calif., etc.

In one embodiment of the invention, the geographic information obtained by the speech recognition engine 120 is used to select a particular grammar from the grammar database 130. In one embodiment of the invention, a particular grammar is selected from the grammar database 130 according to an area code associated with the caller. In another embodiment of the invention, a particular grammar is selected from the grammar database 130 according to a city and/or state associated with the caller. The particular grammar is used to bias the voice recognition engine 120 to select the listings local to the caller more frequently then listings outside the caller's geographic region. The voice signal of the caller is matched to one or more entries of the area specific grammar. The corresponding information 125 is then returned to the caller 169. In one embodiment of the invention, the entries of the grammar are weighted and in the case that the voice signal matches more than one entry of the grammar, the entry having the highest weighting is selected. In an alternative embodiment of the invention, the grammar weights are directly used by the speech recognition engine to obtain probabilities, which drive the selection of one entry over the others in the grammar.

Figure 2:
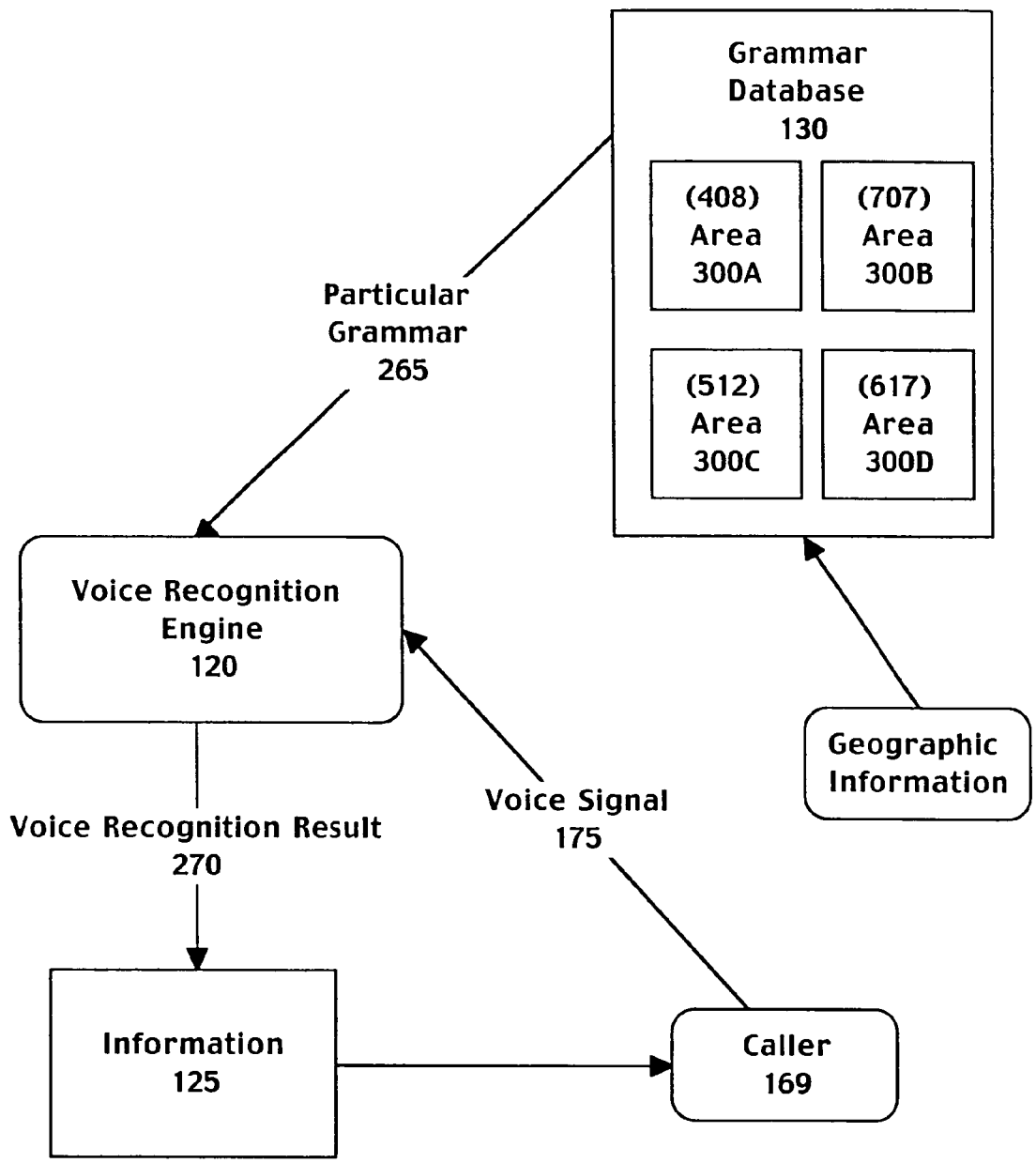
FIG. 2 is a data flow diagram of an exemplary voice recognition engine in accordance with embodiments of the present invention.

FIG. 2 is a data flow diagram of an exemplary voice recognition system in accordance with embodiments of the present invention. The voice recognition engine 120 accesses the voice signal 175 of the caller 169. The voice signal may be digitally encoded. The voice recognition engine 120 then is provided with an appropriate grammar 265 from the grammar database 130. The grammar database 130 comprises a plurality of grammars (e.g., (408) area 300A, (707) area 300B, ((512) area 300C, (617) area 300D).

In one embodiment of the invention, the grammar 265 is selected based on geographic information associated with the caller 169. In another embodiment of the invention, the grammar 265 is selected and then the contents of the selected grammar are modified, for example, by the speech recognition engine 120 depending on the geographic information of the caller. In one embodiment of the invention, the contents of the selected grammar 265 are weighted according to geographic information associated with the caller 169. In effect, the selected grammar is customized to improve speech recognition for cities local to the geographic information of the caller. The voice signal is then matched to a voice recognition result 270 of the selected grammar 265. The corresponding information 175 e.g., a listing, is returned to the caller 169.

FIG. 3A is a block diagram of an exemplary partial city/state grammar 300A based on geographic information in accordance with embodiments of the present invention. Grammar 300A corresponds to, for example, the (408) area code. The grammar 300A includes a plurality of cities that callers frequently request directory listings from when they are in the (408) area code and others outside the local area. In another embodiment of the invention, grammar 300A includes a plurality cities that callers frequently request directory listings from when the caller identification information includes the (408) area code. In this embodiment of the invention, while in the (408) area code, a caller does not need to specify the state for cities that are local to the (408) area code, e.g., "San Jose" and "San Jose, Calif." are included as separate entries. If the caller wants a listing for a city that is not local to the (408) area code, the caller must specify the state name when making the request, e.g., only "Boston, Mass." is listed (no "Boston"). It is appreciated that the grammar database 130 of FIG. 1 may include a plurality of grammars for a particular city or area code.

Referring now to FIG. 3B, a block diagram of an exemplary weighted grammar is shown in accordance with embodiments of the present invention. In one embodiment, entries of a grammar are allowed to include only a city name for those cities local to the geographic information of the caller while cities external to the local geographic information are required to associate the state name therewith. In one embodiment of the invention, a directory listing can be provided even if a caller omits the state name in the audio request. In effect, the geographic information associated with the caller is used to predict the state that the caller is requesting a directory listing from.

In addition to providing city name only entries, grammar 300B is also weighted to influence or bias the output of the speech recognition engine. The weighting may be done to bias selection of local cities over cities located far away from the caller's geographic information. This is done on the basis that a caller is more likely to request a local city. The cities that are more frequently requested are assigned a higher weighting. For instance, grammar 300B is associated with the (707) area code (in California). Therefore, cities located in California have higher weighing values than the cities in Texas or Massachusetts.

Therefore, the entries of a particular grammar are weighted according to geographic information associated with the caller. The entries of a grammar may be weighted according to the likelihood that the caller is requesting a listing from a particular city when located in a particular area code. In one embodiment of the invention, the entries of a grammar are weighted according to the likelihood that the caller is requesting a listing from a particular city when the caller identification information includes that particular area code. It is appreciated that entries of a grammar can be modified or weighted according to any criteria in accordance with embodiments of the present invention. It is also appreciated that the geographic information can be determined from telephone network information, cellular tower identification information or any other information that can be used to determine or predict the location of a caller.

FIG. 3C is a block diagram of an exemplary grammar comprising weighted entries for Austin, Tex. in accordance with embodiments of the present invention. In this embodiment, grammar 300C comprises grammar entries for the (512) area code for Austin, Tex. The grammar comprises entries that include only a city name for cities that are local to the (512) area code. The grammar 300C also comprises entries for cities that are not local to the (512) area code. For example, Boston, Mass. is not local to the (512) area code and therefore requires a state name for matching. In this embodiment of the invention, cities that are not local to the specific area code must include a city name and a state name for their entry in the grammar. To receive a listing for Boston while calling from the (512) area code, a caller must specify "Boston, Mass." when making the directory request.

The entries of grammar 300C are also weighted. The local city entries (e.g., "Austin," and "Austin, Tex.") are given higher weights over the distant but similarly sounding city names, e.g., "Boston, Mass." On the other hand, the grammar 300D for the local Boston area is quite different with its weighting values favoring local cities of the Boston area.

FIG. 3D is a block diagram of an exemplary grammar comprising weighted entries for Boston, Mass. in accordance with embodiments of the present invention. In this embodiment, grammar 300D comprises grammar entries for the (617) area code for Boston, Mass. The grammar comprises entries that include only a city name for cities that are local to the (617) area code. The grammar 300D also comprises entries for cities that are not local to the (617) area code but these require state names associated therewith. For example, Austin, Tex. is not local to the (617) area code. In this embodiment of the invention, cities that are not local to the specific area code must include a city name and a state name for their entry in the grammar. To receive a listing for Austin while calling from the (617) area code, a caller must specify "Austin, Tex." when making the directory request.

The entries of grammar 300D are also weighted. The local city entries (e.g., "Boston," and "Boston, Mass.") are given higher weights over the distant but similarly sounding city names, e.g., "Austin, Tex." It is appreciated that grammar database 130 would contain a separate grammar, like 300C and 300D, for each geographic area covered. Therefore, each geographic area would have its own unique or customized grammar.

Figure 4:
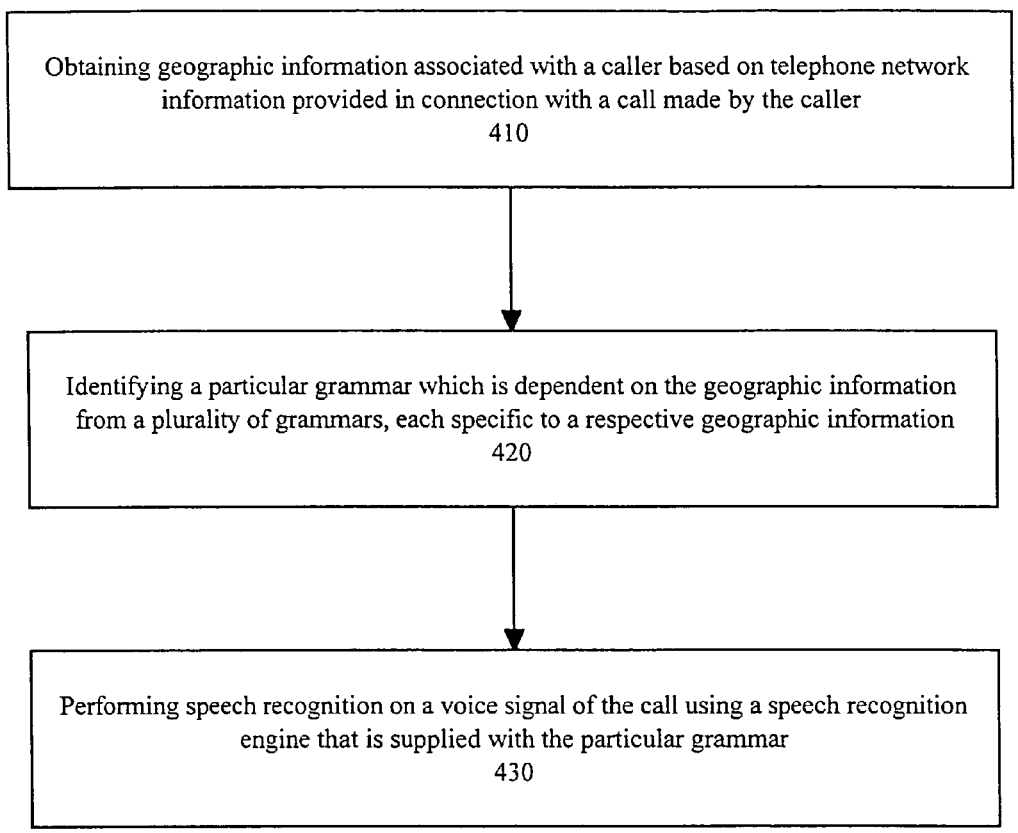
FIG. 4 is a flow diagram of an exemplary computer implemented method for performing voice recognition in accordance with embodiments of the present invention.

FIG. 4 is a flow diagram of an exemplary process 400 for performing voice recognition in accordance with embodiments of the present invention. In one embodiment of the invention, a speech recognition engine is configured based on geographic information associated with a caller.

At step 410, method 400 includes obtaining geographic information associated with a caller based on telephone network information provided in connection with a call made by the caller. This can be done transparently to the caller. In one embodiment of the invention, caller ID/cellular tower ID logic is used to determine the caller identification and/or cellular tower identification information.

At step 420, method 400 includes identifying a particular grammar, which is dependent on the geographic information from a plurality of grammars, each specific to a respective geographic information. In one embodiment of the invention, each grammar is unique and customized for a particular area code, city, region, or any other geographic classification. In one embodiment of the invention, a grammar may be automatically generated based on caller statistics for a particular geographic classification.

At step 430, method 400 includes performing speech recognition on a voice signal of the call using a speech recognition engine that is supplied with the particular grammar. It is appreciated that embodiments of the present invention are well suited to be used on a variety of speech recognition engines and systems that use speech recognition engines.

Figure 5:
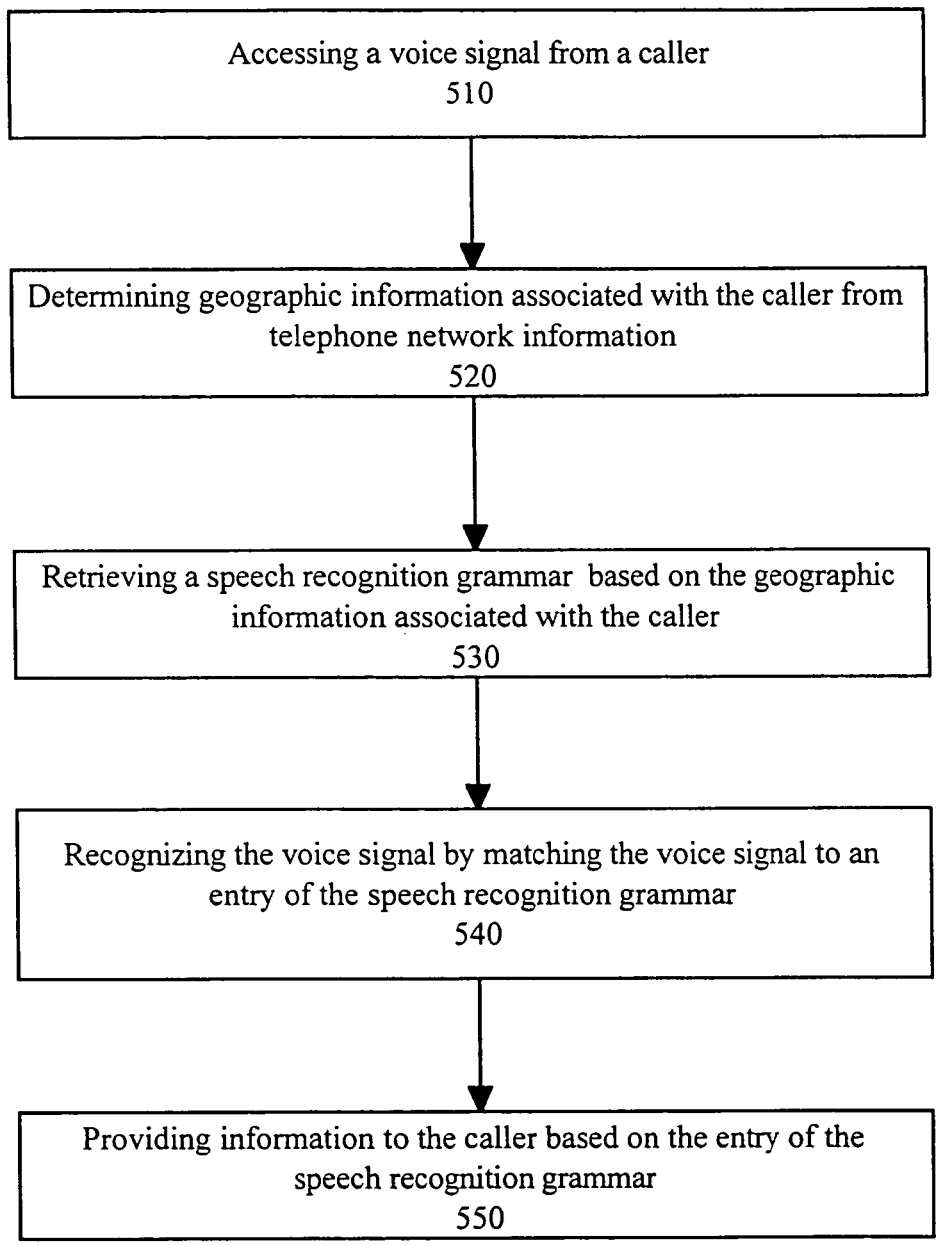
FIG. 5 is a flow diagram of an exemplary computer implemented method for providing information to a caller based on geographic information in accordance with embodiments of the present invention.

FIG. 5 is a flow diagram of an exemplary computer implemented method 500 for providing information to a caller based on geographic information in accordance with embodiments of the present invention.

At step 510, method 500 includes accessing a voice signal from a caller. In one embodiment of the invention, the voice signal is an audio directory assistance request and includes a recitation of a city pertinent to the request. However, it is appreciated that embodiments of the present invention are well suited to be used to access any voice signal.

At step 520, method 500 includes automatically determining geographic information associated with the caller from telephone network information. As stated above, telephone network information can include caller identification information, cellular tower identification information or any other information that can be used to determine the location of a caller.

At step 530, method 500 includes retrieving a speech recognition grammar based on the geographic information associated with the caller. In one embodiment of the invention, the grammar is selected based on the area code or prefix of the telephone number of the caller. In another embodiment of the invention, the grammar is selected based on a cellular tower identifier that can be used to determine the location of a caller. The selected grammar includes weighting values that are customized to the geographic information to bias speech recognition processes to more likely select cities within or local to the geographic information.

In another embodiment of the invention, the selected grammar is customized for the geographic information of the caller by including entries that require only the city name for a match and not the state name in conjunction therewith. This is done for local cities of the geographic information. For cities that are not local to the geographic information, the selected grammar requires the recitation of the state along with the city name with all entries.

At step 540, method 500 includes recognizing the voice signal by matching the voice signal to an entry of the grammar. In one embodiment of the invention, the voice signal is matched to one or more weighted entries and the entry with the highest weighting is selected as the recognition result. In this example, the recognition result corresponds to a city.

At step 550, method 500 includes providing directory assistance information to the caller based on the recognition result. In one embodiment of the invention, the caller is automatically connected to the requested directory listing. In one embodiment, the caller is furnished with listing information regarding a listing within the recognized city.

Figure 6:
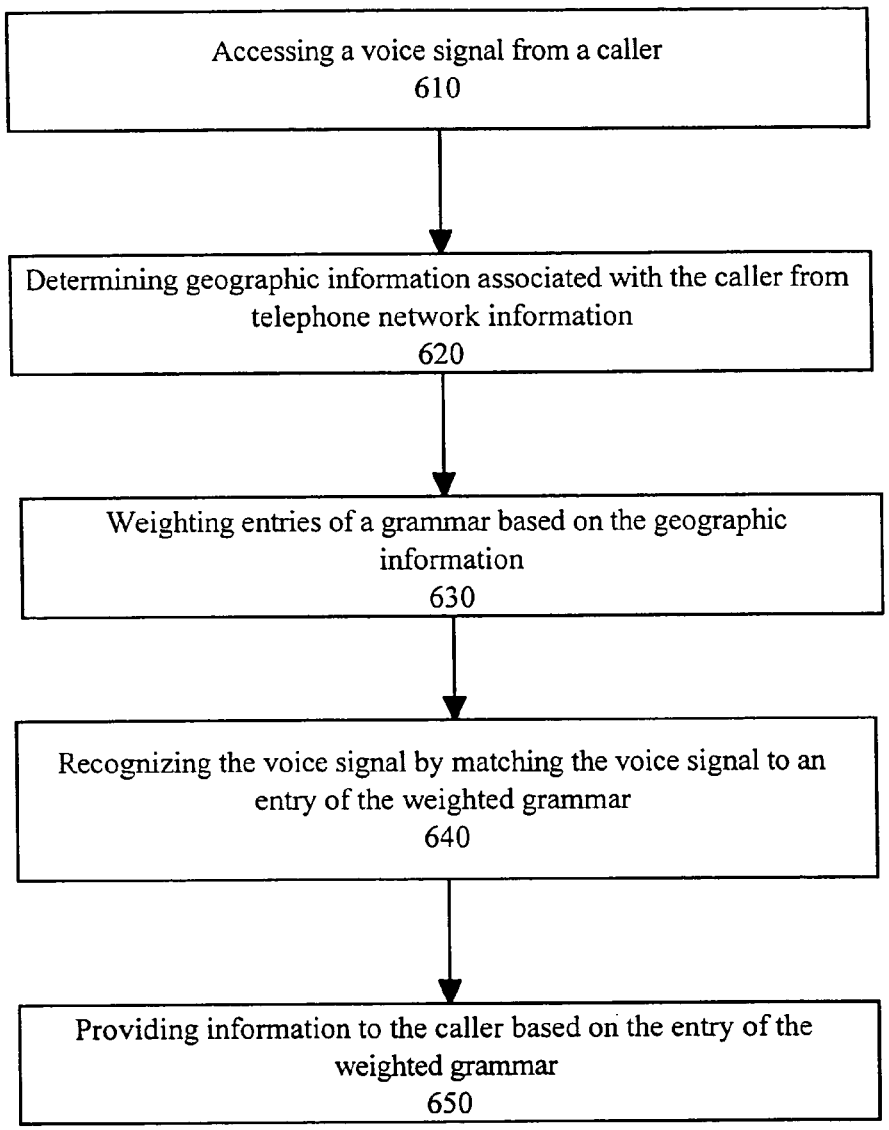
FIG. 6 is a data flow diagram of an exemplary computer implemented method for weighting entries of a grammar according to geographic information in accordance with embodiments of the present invention.

FIG. 6 is a flow diagram of an exemplary method 600 for weighting entries of a grammar based on geographic information associated with a caller in accordance with embodiments of the present invention. Process 600 is similar to process 500, except in this embodiment of the invention, entries of a grammar are modified, e.g., entries are assigned weighted values.

At step 610, method 600 includes accessing a voice signal from a caller. At step 620, method 600 includes automatically determining geographic information associated with the caller from telephone network information. The details of accessing a voice signal and determining geographic information associated with the caller as described with respect to FIG. 5 may be used for step 620.

At step 630, method 600 includes weighting entries of a grammar based on the geographic information associated with the caller so that the resulting grammar is customized to the geographic information, as described with respect to FIG. 5. In one embodiment of the invention, step 630 further comprises selecting a grammar from a plurality of grammars based on the geographic information associated with the caller. In one embodiment of the invention, entries of a selected grammar are weighted according a likelihood the caller will be requesting a listing from particular cities within the geographic information of the caller. In one embodiment of the invention, entries that are physically closer to the caller are weighted higher. In another embodiment of the invention, entries of the grammar are weighted according to call statistics that can be provided by the speech recognition engine, for example.

At step 640, method 600 includes recognizing the voice signal by matching the voice signal to an entry of the weighted grammar resulting in a recognition result. In one embodiment of the invention, the voice signal is matched to a plurality of entries of the grammar and the entry with the highest weighting is selected as the recognition result. In this example, a particular city is identified.

At step 650, method 600 includes providing information to the caller based on the selected entry of the weighted grammar. In one embodiment of the invention, the information is a telephone number for a requested directory listing within the identified city. In one embodiment of the invention, the caller may be automatically connected to the requested directory listing.

Embodiments of the present invention improve speech recognition accuracy by selecting a grammar based on geographic information associated with a caller. Embodiments of the present invention improve speech recognition even if a caller omits the state from the city specification. By directly handling user responses with the state omitted, in addition to increasing automation, re-prompting is avoided, saving valuable time in the call flow.

Exemplary Computer System

Figure 7:
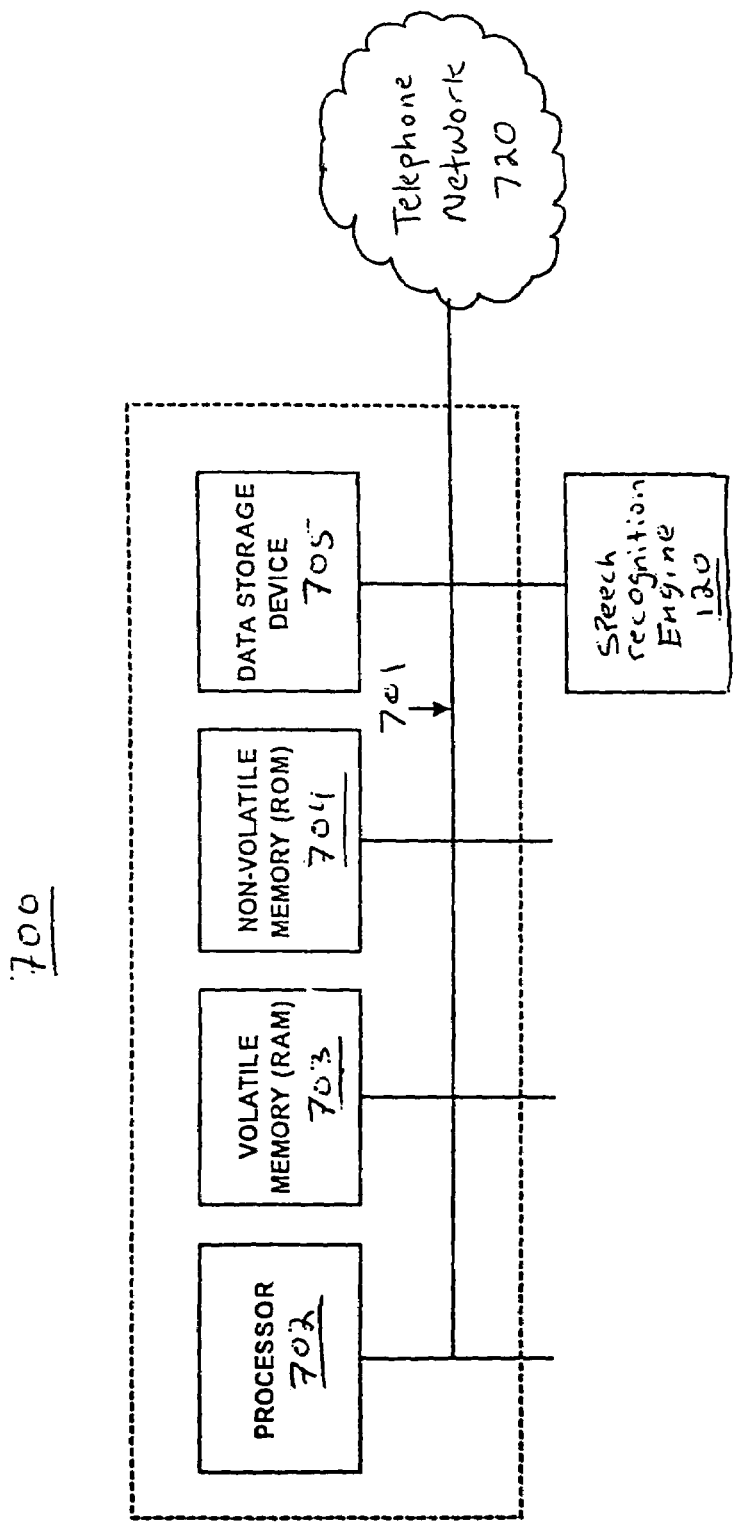
FIG. 7 is a block diagram of an exemplary computer system in accordance with embodiments of the present invention.

With reference to FIG. 7, portions of the present invention are comprised of computer-readable and computer-executable instructions that may reside, for example, in computer system 700, which may be used as a part of a general-purpose computer network (not shown). It is appreciated that computer system 700 of FIG. 7 is exemplary only and that the present invention can operate within a number of different computer systems including general-purpose computer systems, embedded computer systems, and stand-alone computer systems.

In the present embodiment, computer system 700 includes an address/data bus 701 for conveying digital information between the various components, a central processor unit (CPU) 702 for processing the digital information and instructions, a volatile main memory 703 comprised of volatile random access memory (RAM) for storing the digital information and instructions, and a non-volatile read only memory (ROM) 704 for storing information and instructions of a more permanent nature. In addition, computer system 700 may also include a data storage device 705 (e.g., a magnetic, optical, floppy, or tape drive or the like) for storing vast amounts of data. It should be noted that the software program for outputting information of the present invention can be stored either in volatile memory 703, data storage device 705, or in an external storage device (not shown).

Furthermore, computer system 700 can include an input/output (I/O) signal unit (e.g., interface) 709 for interfacing with a peripheral device 710 (e.g., a telephone network 720). Computer system 700 also may include a speech recognition engine 120. Speech recognition engine can be hardware-based or software based and can be a remote client in some embodiments of the invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of a directory assistance application using voice recognition to provide information of a requested directory listing, the method, comprising:
   identifying caller geographic information associated with a call using telephone network data provided with the call;
   wherein, the caller geographic information is associated with a caller geographic locale;
   selecting, from a plurality of grammars, a particular grammar that is customized for the caller geographic locale;
   wherein the particular grammar comprises a plurality of entries, each of which represents a geographical location;
   determining a speech recognition result by matching a voice signal of the call to an entry of the plurality of entries in the particular grammar;
   wherein, in the particular grammar customized for the caller geographic locale, a local city entry in the plurality of entries includes the name of the local city without a state name within which the local city resides, the local city being local to the caller geographic locale;
   wherein, in the particular grammar, a non-local city entry in the plurality of entries includes the name of the non-local city and another state name within which the non-local city resides, the non-local city being non-local to the caller geographic locale.

2. The method of claim 1, further comprising, assigning weighting values to two or more entries of the plurality of entries of the particular grammar.

3. The method of claim 2, wherein:
   the weighting values are assigned according to call statistics.

4. The method of claim 1 wherein the telephone network data is one or more of, an area code and a cellular telephone tower associated with the call.

5. The method of claim 1 wherein the speech recognition result is a city or a city and a state represented by the entry that is matched to the voice signal.

6. The method of claim 1 wherein the plurality of grammars further comprise:
   a first grammar comprising a first set of entries associated with a first plurality of weighting values which are customized for a first caller geographic locale; and
   a second grammar comprising a second set of entries associated with a second plurality of weighting values which are customized for a second caller geographic locale.

7. The method of claim 6, wherein:
   the first caller geographic locale is associated with a first area code; and
   the second caller geographic locale is associated with a second area code.

8. The method of claim 2 wherein,
   the weighting values are assigned according to a likelihood that the requested directory listing is located within the geographical locations represented by the two or more entries based on the caller geographic locale.

9. The method of claim 3 wherein,
   the two or more entries represent a first city and a second city, respectively; and
   wherein, the weighting values are such that a first entry representing the first city that is more frequently requested by callers of the geographical locale is weighted higher in the particular grammar than a second entry representing the second city that is less frequently requested by callers.

10. The method of claim 5 further comprising:
    retrieving the information of the requested directory listing based on the city or the city and the state represented by the entry that is matched to the voice signal of the caller; and
    providing the information to the caller.

11. A method for performing speech recognition on a voice signal of a caller on a call in a directory assistance application to provide information of a requested directory listing, the method, comprising:
    determining caller geographic information associated with the call using telephone network data;
    wherein, the caller geographic information is associated with a caller geographic locale;
    selecting a speech recognition grammar that is customized for the caller geographic locale, the speech recognition grammar comprising a plurality of entries, each of which represents a geographical location;
    determining a speech recognition result by matching said voice signal to an entry of the plurality of entries in said speech recognition grammar;
    wherein, the speech recognition result is an identified geographical region within which the requested directory listing is located; and
    audibly providing the information of the requested directory listing to said caller;
    wherein, in the speech recognition grammar customized for the caller geographic locale, a local city entry in the plurality of entries includes the name of the local city without a state name within which the local city resides, the local city being local to the caller geographic locale;
    wherein, in the speech recognition grammar, a non-local city entry in the plurality of entries includes the name of the non-local city and another state name within which the non-local city resides, the non-local city being non-local to the caller geographic locale.

12. The method of claim 11 wherein said telephone network data includes caller identification information associated with said caller.

13. The method of claim 11 wherein said telephone network data comprises a cellular tower identifier.

14. The method of claim 11 further comprising:
    retrieving the information of the requested directory listing based on the identified geographical region.

15. The method of claim 11 wherein said caller geographic information is obtained according to caller identification information associated with said call or a cellular tower identifier.

16. The method of claim 11 wherein, two or more entries of the plurality of entries are assigned weighting values, the weighting values assigned based on the caller geographic locale and according to a likelihood the caller will request information of a directory listing located within the geographical locations represented by the two or more entries.

17. The method of claim 11 further comprising:
modifying said speech recognition grammar based on said caller geographic information associated with said call.

18. A system using a speech recognition engine to provide directory assistance to a caller for information of a requested directory listing, the system, comprising:
a geographic determiner for determining caller geographic information using telephone network information associated with a call made by the caller;
wherein, the caller geographic information is associated with a caller geographic locale;
a grammar retriever for selecting a speech recognition grammar based on the caller geographic information;
wherein the speech recognition grammar comprises a plurality of entries, each of which represents a geographical location;
wherein, the speech recognition engine, is biased by the speech recognition grammar to select directory listings local to the caller geographic locale more frequently than directory listings outside the caller geographic locale;
the speech recognition engine recognizes the voice signal by matching the voice signal to an entry of the plurality of entries of the speech recognition grammar;
an output for providing, to the caller, the information of the requested directory listing located within the geographical location represented by the entry;
wherein, in the speech recognition grammar customized for the caller geographic locale, a local city entry in the plurality of entries includes the name of the local city without a state name within which the local city resides, the local city being local to the caller geographic locale;
wherein, in the speech recognition grammar, a non-local city entry in the plurality of entries includes the name of the non-local city and another state name within which the non-local city resides, the non-local city being non-local to the caller geographic locale.

19. The system of claim 18 wherein the telephone network data associated with said caller is determined by one or more of, a cellular tower identifier and an area code.

20. The system of claim 18 wherein the entry in the speech recognition grammar to which the voice signal of the caller is matched, is a city or a city and a state within which the requested directory listing is located.

21. The system of claim 18 wherein:
the speech recognition engine is provided with weighting values of two or more entries of the plurality of entries; and
wherein, the weighting values are assigned according to a likelihood that the requested directory listing is located within the geographical locations represented by the two or more entries determined by the caller geographic locale.

22. The system of claim 21 wherein:
the two or more entries represent a first city and a second city, respectively; and wherein, the weighting values are assigned according to call statistics such that the first entry representing the first city that is more frequently requested by callers of the geographical locale is weighted higher in the speech recognition grammar than the second entry representing the second city that is less frequently requested by callers.

23. The system of claim 18 wherein the geographical location represented by the entry is a city or a combination of a city and state.

24. A computer readable medium comprising executable instructions which, when executed in a processing unit, causes the processing unit to perform a method of performing speech recognition on a voice signal of a caller on a call in a directory assistance application to provide information of a requested directory listing, the method, comprising:
identifying caller geographic information associated with the call using telephone network data provided with the call made;
wherein, the caller geographic information is associated with a caller geographic locale;
selecting, from a plurality of grammars, a particular grammar which is customized for the caller geographic locale;
wherein the particular grammar comprises a plurality of entries, each of which represents a geographical location;
wherein, two or more entries of the plurality of entries of the particular grammar are assigned weighting values, the weighting values assigned based on the caller geographic locale and according to a likelihood the caller will request information related to a directory listing located within the geographical locations represented by the two or more entries;
determining a speech recognition result by matching the voice signal using a speech recognition engine that is supplied with the particular grammar and using the weighting values to select, an entry of the plurality of entries of the particular grammar as the speech recognition result;
wherein, the speech recognition result is an identified city or city and state within which the requested directory listing is located;
retrieving the information of the requested directory listing based on the identified city or city and state; and
providing the information of the requested directory listing to the caller;
wherein, in the particular grammar customized for the caller geographic locale, a local city entry in the plurality of entries includes the name of the local city without a state name within which the local city resides, the local city being local to the caller geographic locale;
wherein, in the particular grammar, a non-local city entry in the plurality of entries includes the name of the non-local city and another state name within which the non-local city resides, the non-local city being non-local to the caller geographic locale.

25. The computer readable medium of claim 24 wherein the information includes a telephone number for the requested directory listing; and
wherein, the caller is automatically connected to the requested directory listing.

26. The computer readable medium of claim 24 wherein said telephone network data is an area code associated with said call.

27. The computer readable medium of claim 24 wherein said telephone network data is a cellular telephone tower associated with said call.

28. The computer readable medium of claim 24 wherein the weighting values are assigned according to call statistics.

29. The computer readable medium of claim 28 wherein: the weighting values are assigned such that entries representing cities that are more frequently requested by callers of a geographical locale identified by the caller geographic information are weighted higher in the particular grammar than entries representing other cities that are less frequently requested.

* * * * *

UNITED STATES PATENT AND TRADEMARK OFFICE
CERTIFICATE OF CORRECTION

PATENT NO. : 7,630,900 B1
APPLICATION NO. : 11/002003
DATED : December 8, 2009
INVENTOR(S) : Nikko Strom It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 879 days.

Signed and Sealed this

Second Day of November, 2010

David J. Kappos
*Director of the United States Patent and Trademark Office*